Sept. 3, 1929.   H. I. MORRIS   1,726,755
MACHINE FOR MAKING TIRE FORMING MATERIAL
Filed Dec. 31, 1920   5 Sheets-Sheet 4
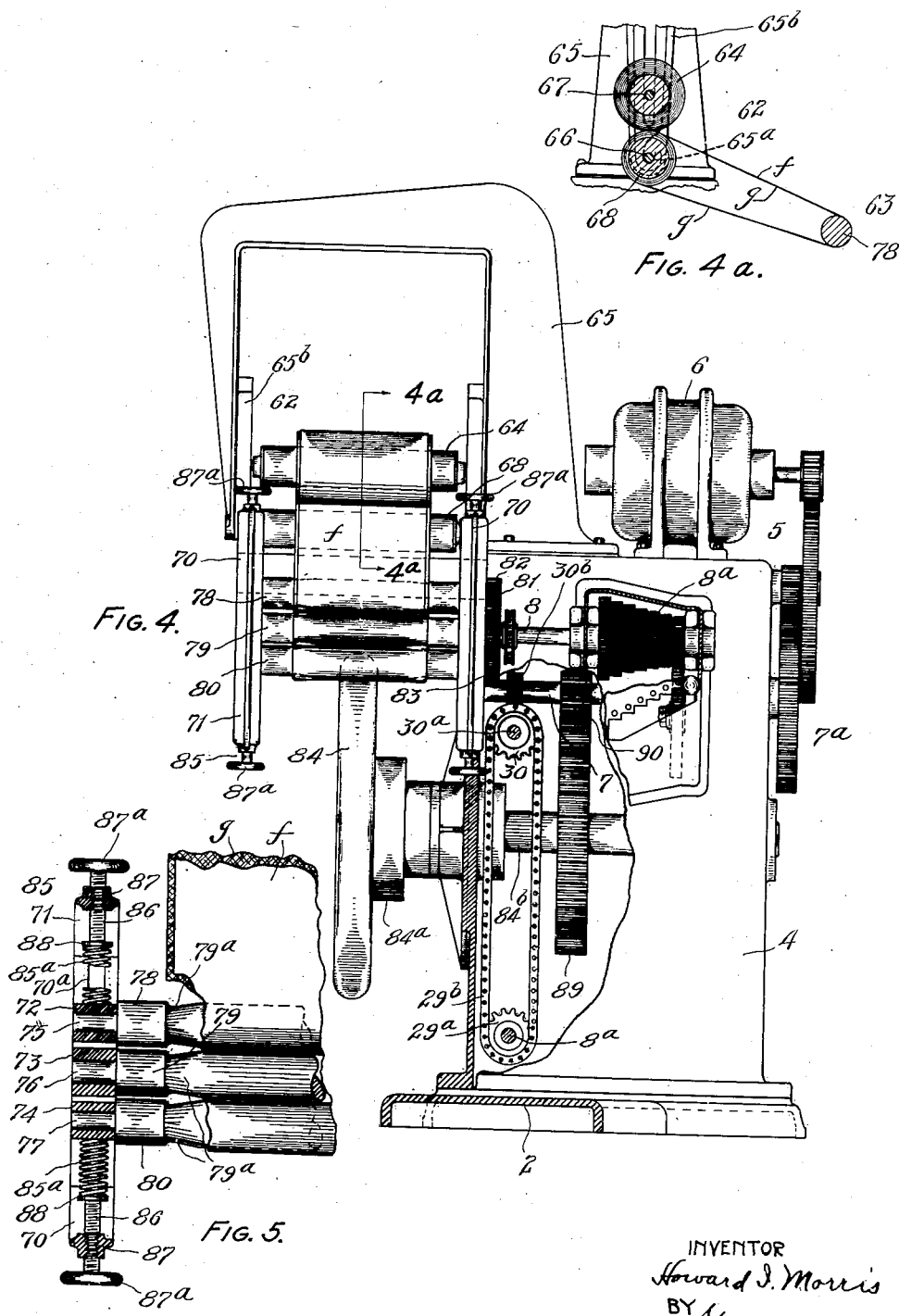

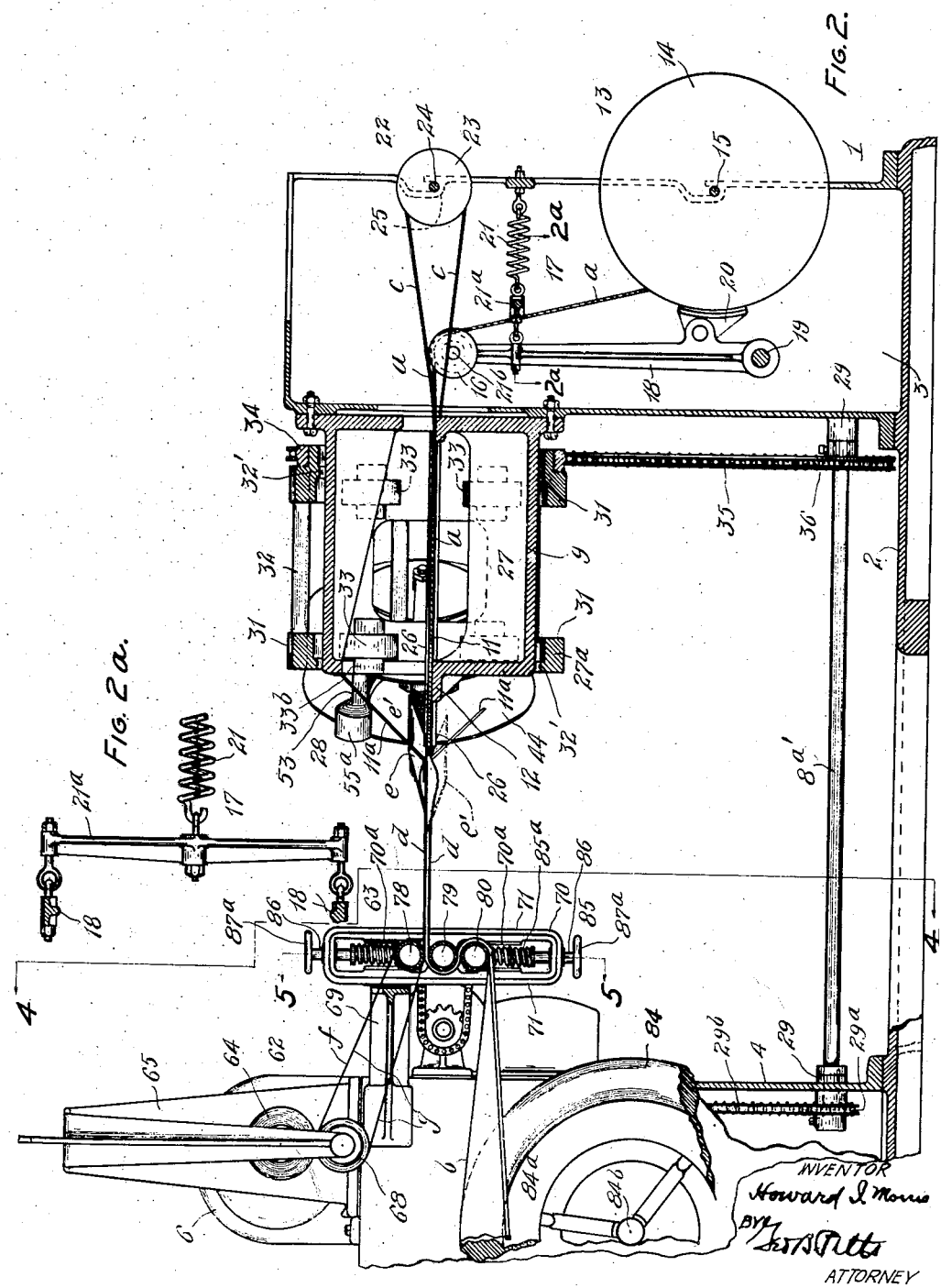

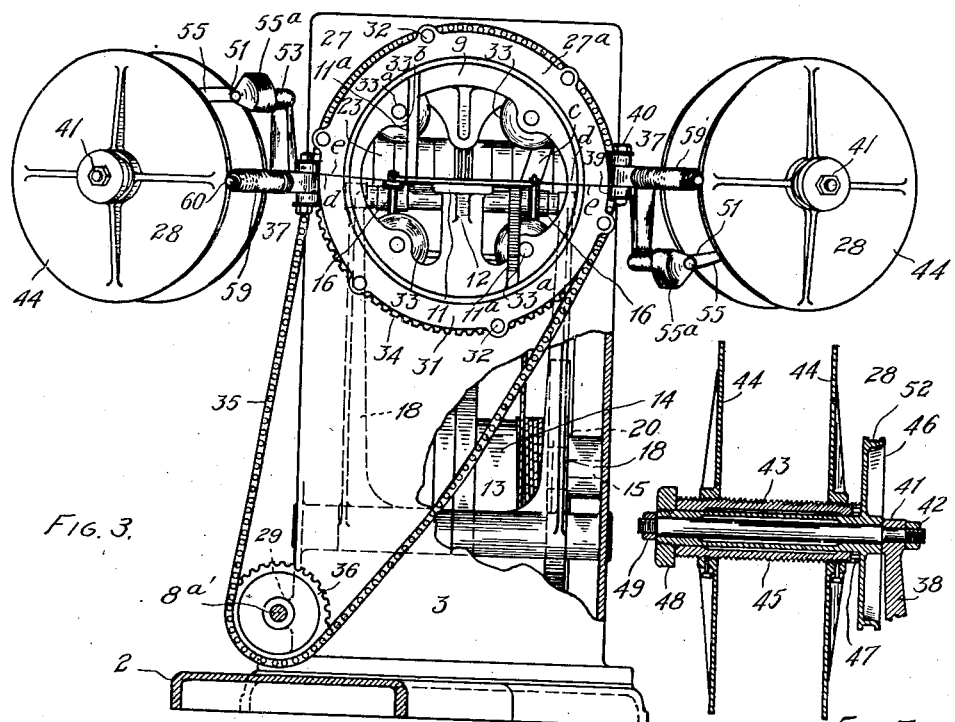
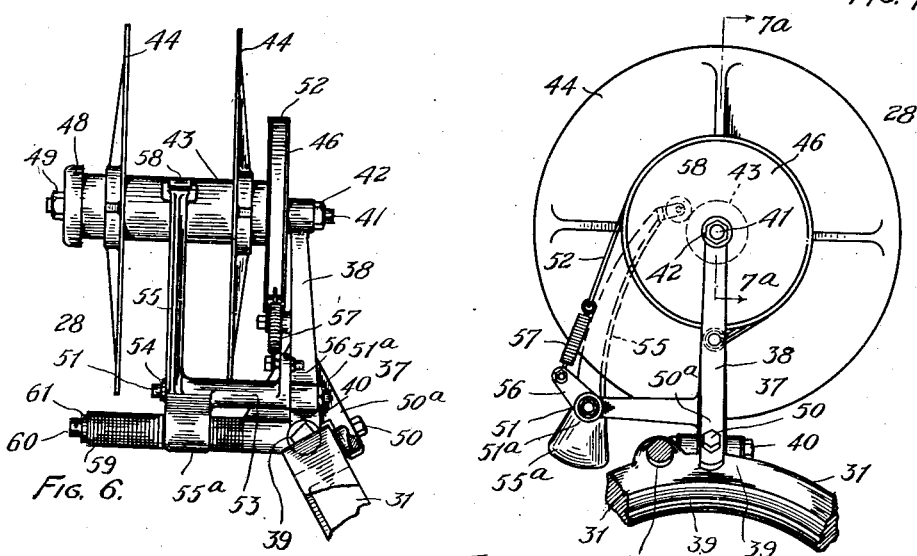

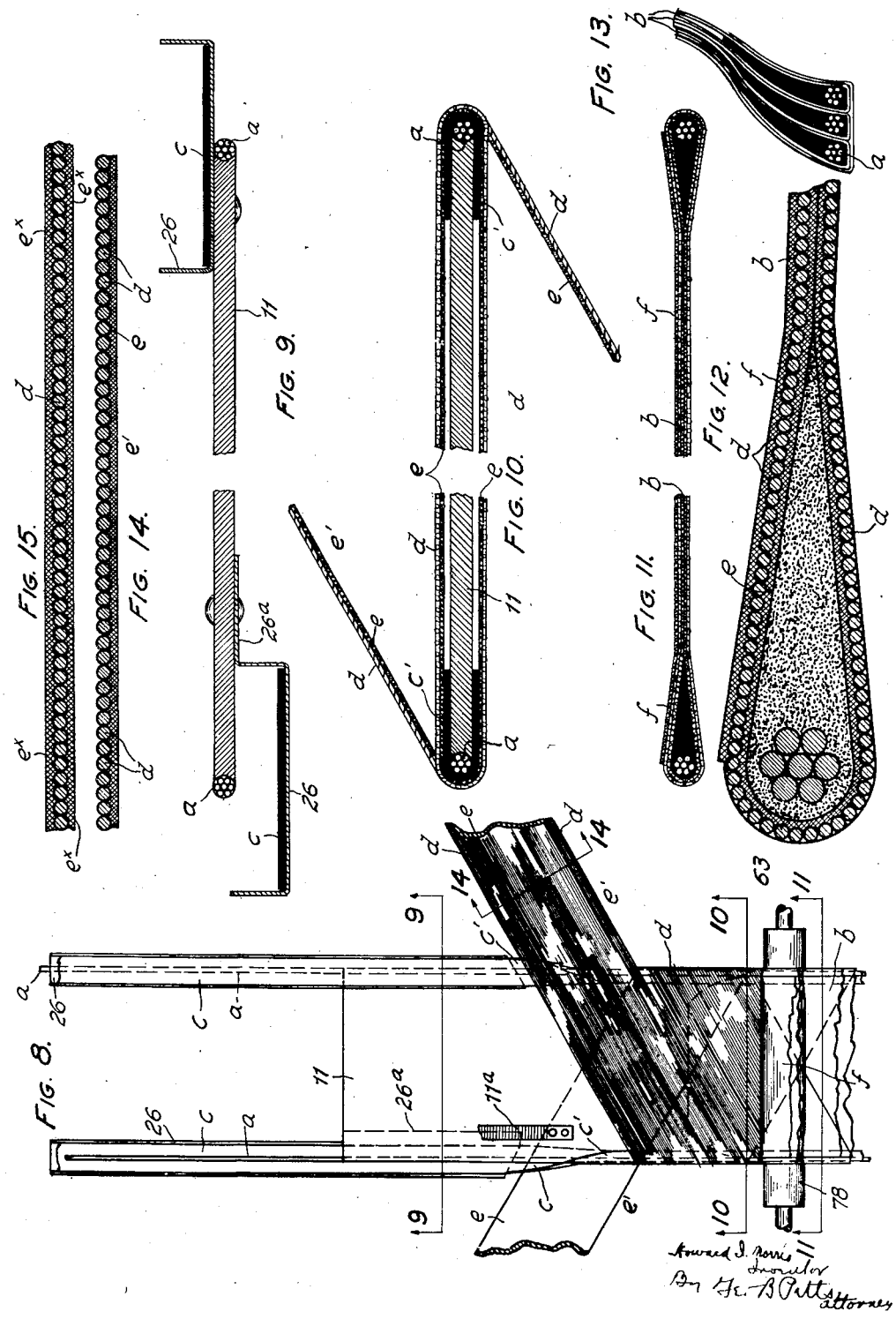

Patented Sept. 3, 1929.

1,726,755

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

MACHINE FOR MAKING TIRE-FORMING MATERIAL.

Application filed December 31, 1920. Serial No. 434,244.

This invention relates to a machine for making a continuous strip of material, particularly adapted for making tire carcasses.

One object of the invention is to provide a machine of this character of relatively simple construction and capable of operating continuously, if desired.

Another object of the invention is to provide improved means for making corded tire forming material in an economical and rapid manner.

Another object of the invention is to provide improved tire cord material forming means, wherein the cords may be rapidly and economically delivered to the remaining materials constituting the tire forming material.

Another object of the invention is to provide an improved machine for forming into a single continuous strip, all of the materials required for making a tire carcass, whereby the same can be applied to the tire making core rapidly and economically.

Another object of the invention is to provide an improved machine capable of combining together into a unitary web of material the various materials, including the beads, for making tire carcasses, whereby all of the tire carcass forming materials can be simultaneously applied.

Another object of the invention is to provide an improved machine for continuously supplying a plurality of tire forming materials and uniformly and continuously associating and consolidating them into a unitary web capable for use in making tire carcasses.

A further object of the invention is to provide an improved machine for making a web for tire making purposes wherein the various materials are so correlated that all waste thereof is eliminated.

A further object of the invention is to simplify the construction of the machine shown and described in my co-pending application Serial No. 248,892, filed Aug. 8, 1918, renewed as Serial No. 532,039, Jan. 26, 1922, and patented No. 1,677,400, July 17, 1928.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

In the drawings, Fig. 1 is a top plan view of a machine for making tire forming material embodying my invention.

Fig. 2 is a fragmentary longitudinal sectional view on the line 2—2 of Fig. 1.

Fig. 2$^a$ is a section on the line 2$^a$—2$^a$ of Fig. 2.

Fig. 3 is a transverse sectional view on the line 3—3 of Fig. 1.

Fig. 4 is a transverse section on the line 4—4 of Fig. 2 looking in a direction opposite to that of Fig. 3, parts being broken away.

Figure 1:
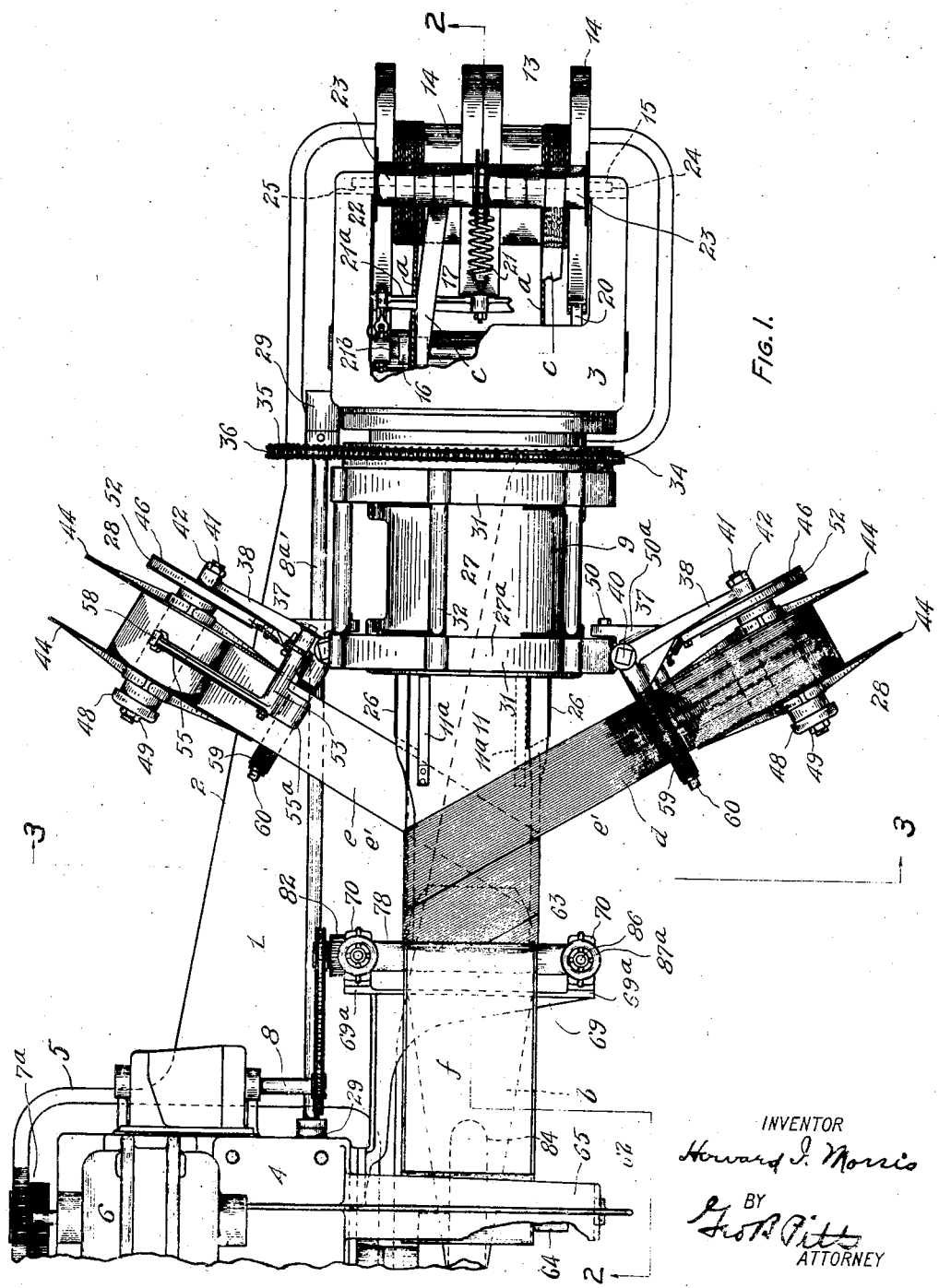

Fig. 4$^a$ is a fragmentary section on the line 4$^a$—4$^a$ of Fig. 4.

Fig. 5 is a detail fragmentary view on the line 5—5 of Fig. 2.

Fig. 6 is a fragmentary elevation of a reel and its support.

Fig. 7 is a side view of the parts shown in Fig. 6.

Fig. 7$^a$ is a section on the line 7$^a$—7$^a$ of Fig. 7.

Fig. 8 is a fragmentary plan view showing the manner of assembling or associating the various materials and the consolidating thereof into a unitary web of tire forming material.

Fig. 9 is a section, enlarged, on the line 9—9 of Fig. 8.

Fig. 10 is a section, enlarged, on the line 10—10 of Fig. 8.

Fig. 11 is a section, enlarged, on the line 11—11 of Fig. 8.

Fig. 12 is a fragmentary sectional view of the tire forming material on the line 11—11 of Fig. 8, showing the bead material and the filler as these elements are disposed after the tire forming material has been completed.

Fig. 13 is a fragmentary sectional view of a tire carcass showing the disposition of the bead material and the filler therearound after the tire forming material has been applied to a core and the carcass completed.

Fig. 14 is a sectional view, enlarged, of the corded rubber ribbon used for making tire forming material being taken on the line 14—14 of Fig. 8.

Fig. 15 is a sectional view, enlarged, of a corded rubber ribbon, but showing a slightly modified form of construction.

In the drawings, 1 indicates as an entirety a frame. The frame preferably comprises a base 2, a standard 3 and a standard 4. The standards 3 and 4 may be formed in the shape of casings or housings to enclose as well as support certain parts of the apparatus, to which reference will later be made. The standards 3 and 4 may be secured to the base 2 in any suitable manner. The base 2 and standards 3 and 4 may be similar in shape and construction to like elements shown and described in my aforesaid co-pending application.

5 indicates as an entirety a power mechanism supported on the standard 4. This mechanism may also be similar to that shown and described in my aforesaid application, to which reference is made for a detailed description thereof. The power mechanism 5 is shown as consisting of an electric motor 6, which operates to drive a shaft 7 through a gear train 7ª and a shaft 8, preferably through a speed change mechanism indicated as an entirety at 8ª. The motor 6 is controlled by a suitable switch mechanism (not shown).

9 indicates an annular member secured to the inner side wall of the standard 3 and extending laterally therefrom toward the standard 4. The member 9 is mounted on the standard 3 in any suitable manner.

11 indicates a support which is fixed to a bracket 12, preferably formed integral with the member 9. The bracket 12 may be arranged at the front end of the member 9. As shown, the support 11 is preferably arranged horizontally in the plane of the longitudinal axis of said member 9 and substantially coincident therewith. 11ª, 11ª, indicate supplemental brackets, connected at their opposite ends to the member 9 and support 11 for bracing the latter. The support 11 extends forwardly from the bracket 12, whereby it may serve as a spacer and guide for a pair of bead material, a, a, and also as a former for certain of the other elements which constitute the tire forming material indicated at b, as these elements are associated and correlated with each other ready for consolidation or fabrication. The bead material a, a, preferably comprise wire strands.

13 indicates the supply means for the bead material a, a. The supply means 13 may comprise a pair of reels 14 loosely mounted side by side on a shaft 15. The opposite ends of the shaft 15 are preferably removably seated in aligned bearings formed in the side walls of the standard or casing 3. The bead material or strands a are drawn off of the reels 14, being carried over a pair of spaced guide sheaves 16, from which the beads are fed to and along the opposite longitudinal side edges of the former 11. By preference the opposite longitudinal side edges of the former 11 are grooved to form guides for the bead material a, a, and to support them as the various elements of the tire forming material are being assembled.

17 indicates a tension means arranged to act on the reels 14 and control their rotation as the bead material or strands a, a, are drawn off of them. The tension means 17 preferably comprises a pair of arms 18 that are fulcrumed at their lower ends on a shaft 19, a pair of shoes 20, each arranged to frictionally engage the circumferential edge of one side plate or flange of one of the adjacent reels 14, and a spring 21 operatively connected to the arms 18 to operate the brake shoes 20. The shaft 19 is preferably mounted at its opposite ends in any suitable manner in the sides of the standard 3. The shoes 20 are preferably pivoted to arms 18, 18, so that they can accommodate themselves to effectively engage the reel flanges as the arms 18 move about the fulcrum 19. The spring 21 is adjustably connected at one end by means of an eye bolt to the outer side wall of the standard 3; at its other end the spring 21 is connected to an equalizing bar 21ª, which in turn is connected at its opposite ends in a well-known manner to the arms 18, 18. At their upper or free ends, each arm 18 may be bored out to receive and support one end of a stud shaft 21ᵇ on which the adjacent sheave 16 is loosely mounted. From the foregoing description it will be seen that the tension or pull on the bead strands a, a, acts through the sheaves 16 and arms 18 in opposition to the tension spring 21 and causes the release, to a greater or lesser degree, of the shoes 20 from the reel flanges. By adjusting the tension spring, its pull on the arms 18 may be made sufficiently strong to offset the pressure of the sheaves acting in the opposite direction on the arms and permit proper braking action on the reel flanges; accordingly, when the pull on the bead strands a is increased the resulting pressure on the sheaves 16 will move the arms 18 in a direction to disengage or release the shoes 20 from the reel flanges and thus permit the reels to unwind faster until the pull on the bead strands is decreased, whereupon the shoes will again engage the reel flanges under the influence of the spring 21.

22 indicates a source of supply means for further bead material, preferably comprising strips of relatively hard rubber c, c, hereinafter referred to as fillers. In the completed web or tire forming material b, the fillers surround the strands a and extend inwardly therefrom between the plies or folded portions of the material and thus strengthen the beads and reinforce the side walls of the tire carcass adjacent to the beads, thereby tending to prevent rim cutting when the tire is in use. The fillers c, c, are fed along the bead strands a, a, in juxtaposition thereto, one strip above one strand and the other strip below the other strand, for reasons which will later be set forth. The supply means 22 comprises a pair of spools or reels 23 loosely mounted on a shaft 24, whereby the strips may be unwound therefrom. The shaft 24 may be supported at its opposite ends in bearings 25, provided on the side walls of the standard 3. The spools 23 are preferably reversed so that the filler c, which is disposed above one of the bead strands a, unwinds from the upper side of its spool, and the filler c, which is disposed below the other bead strand a, unwinds from the under side of its spool. As shown in Fig. 1, the latter filler feeds around one side of the adjacent bead a so as to be disposed below it.

26 indicates a pair of guides for the fillers c, c. The guides 26 may comprise channel members, whereby their side walls may serve to guide the fillers c in alignment with the beads a. The guide 26 for the filler c, which is disposed above one of the bead strands a, is supported on and fixed to the upper surface of the former 11; whereas the guide 26 for that filler c that is disposed below the other bead strand a is provided along its inner longitudinal side wall with a flange 26ª which engages with and is secured to the under side of the former 11 to support the guide 26 in correlation with the adjacent bead strand a. As shown in Figs. 8 and 9, the guides 26 are arranged to support and guide the fillers c relative to the bead strands a so that a portion of each filler, preferably approximately one-half thereof, will be disposed at or extend to either side of the adjacent bead strand a. As the fillers c leave the free ends of the guides 26 for assembly with the bead strands a that portion of each filler c, which extends beyond the adjacent bead strand a is folded over or around the strand and back against the opposite face of the former 11 by cords d (which constitute an integral portion of the tire forming material b, as will be later set forth) as shown at c; in position to be pressed against and united with that portion of the filler which extends inwardly from the bead, (see Figs. 8 and 9) as will be later described. To permit of this folding operation, the guides 26 terminate slightly rearward of the point where folding over of the fillers c commences (see Fig. 8).

In the present construction, the cords d are fed to the former 11 in a group or groups in parallel relationship, whereby the construction of the machine is simplified and its operation economically controlled. For this purpose the cords d are arranged side by side, preferably in contact with each other and fixed to one face of a strip of rubber e, being intimately pressed into the material of the strip, whereby there is formed a corded rubber web or ribbon, as shown at e' in Fig. 14, that may be wound on a spool for use in my apparatus. This arrangement and construction permits me to readily and economically handle, support and feed or deliver the cords to or about the former 11 and bead strands a and fillers c as the latter move forwardly, as well as prevent all tendency for the cords to spread relatively to each other. It also provides a layer of rubber between adjacent sections of the cords d after the latter are wound and consolidated with the other materials.

27 indicates as an entirety means for supplying the web or webs e' to the former 11 in correlation with the bead strands a and fillers c, whereby these elements may be properly associated or assembled ready for consolidation. The supply means 27 preferably consists of a shuttle 27ª carrying a spool 28 or a plurality of spools 28 depending on the number of webs e' that are to be used in making the material b. In the present construction I have shown a shuttle carrying two spools 28 from each of which a corded rubber web e', preferably having a width approximately one-half that of the tire forming material b, is drawn. In this construction the webs e' are fed simultaneously from opposite sides of the axis of the former 11 and engage therewith at substantially diametrically opposite points as the shuttle 27ª revolves. As the spools revolve about the former 11 in the same direction, the webs e' supplied therefrom engage first with the overlying portions of one filler c and then with the overlying portions of the other filler, successively, to fold these portions of the fillers around the strands and against the opposite surfaces of the former 11, as already set forth.

By using a corded rubber web or webs e' and delivering it or them to the strands a and fillers c from a shuttle, I am enabled to materially simplify the construction of the apparatus, reduce the labor and expense of operation and to insure greater capacity and a better and more uniform product. Such construction also enables me to provide tire forming material in which all of the cords d are continuous and disposed at any angle to the plane of the tire when the material b is made into carcasses.

While I prefer to use a corded rubber web e', as shown in Figs. 8 and 14, I may use a web in which the cords d are disposed between two strips of rubber $e^x$, $e^x$; as shown in Fig. 15.

The shuttle 27ª may comprise a pair of spaced rings 31, 31, connected in fixed relationship by a plurality of rods 32. The rings 31 are preferably flanged around their outer sides, as shown at 32', these flanges co-operating with the inner surfaces or walls of the rings to form tracks for a plurality of rollers 33, which serve to rotatably support the shuttle 27ª. The rollers 33 are loosely supported upon shafts 33ª supported in lugs 33ᵇ which are provided on the inner wall of the annular member 9.

34 indicates a sprocket wheel fixed to the shuttle 27ª, preferably at its inner end. 35 indicates a sprocket chain which extends around the sprocket wheel 34 and also around a sprocket wheel 36 fixed to the shaft 8ª', whereby the shuttle 27ª may be rotated.

The shaft $8^{a\prime}$ is preferably mounted in bearings 29 formed on the inner side walls of the standards 3 and 4. The shaft $8^{a\prime}$ extends through the wall of the standard 4, and carries a sprocket $29^a$ around which a driving chain $29^b$ passes, as shown in Fig. 2. The chain $29^b$ passes around a sprocket 30 (Fig. 4) fixed to a shaft $30^a$ to which is fixed a worm (not shown). $30^b$ indicates a worm fixed to the shaft 7 and meshing with the gear on the shaft $30^a$, whereby the latter is driven.

Each of the spools 28, is, by preference, adjustably supported on the front ring 31, indicated as an entirety at 37, and when a plurality of spools are provided, they are uniformly spaced therearound. The supporting means 37 for each spool comprises an arm 38, the inner end of which is formed with an opening and fits in between two lugs 39, 39, integrally formed on the outer or front ring 31. The lugs are formed with aligned openings which align with the opening in the arm 38 to receive a pivot pin or bolt 40 about which the arm may be swung for adjusting purposes. The outer end of the arm 38 is formed with an opening in which is mounted one end of a shaft 41 adapted to rotatably support the spool 28. The shaft 41 may be fixed in the opening in the arm 38 by a nut 42.

Each spool 28 may comprise a hub 43 adapted to loosely and removably fit on the shaft 41, and one or more side plates or disks 44. The hub 43 may be provided with screw threads near its opposite ends and the disks 44 may be formed with screw-threaded openings to fit on and engage the screw threads on the hub 43. This arrangement provides for the removal of the disks and also their adjustment relative to the center line of feed of the web $e'$, whereby webs of varying widths may be accommodated on the hub. By preference, the hub 43 fits over a sleeve 45 which carries at its inner end a brake band engaging wheel 46, which will later be referred to. The hub 43 is secured at its inner end to the wheel 46 by interlocking devices 47. 48 indicates a device for engaging the sleeve 45 and outer end of the hub 43 for securing the latter thereto. 49 indicates a nut which engages the outer end of the shaft 41 and secures the sleeve 45 thereon.

50 indicates a device for securing the arm 38 in its adjusted position to maintain it at the proper angle relative to the direction of feed of the beads $a$. The device 50 preferably comprises a cap screw which extends through an elongated opening formed in a bracket $50^a$ integrally connected with the arm 38. The free end of the cap screw is arranged to engage the walls of a screw-threaded opening formed in the adjacent ring 31 to hold the arm in its adjusted position. It will be understood that the angle of feed of the web $e'$ will depend upon the relative movement between the bead strands $a$ and shuttle $27^a$; accordingly, by adjusting the arm 38 I am enabled to insure proper correlation therewith of the feed of the web to insure the proper meeting of its side edges as it is helically wound on the former 11.

51 indicates a shaft extending laterally from the arm 38 and parallel to the shaft 41. The shaft 51 is preferably mounted in an opening formed in the arm 38, near its inner end, and secured therein by a nut $51^a$. 52 indicates a brake band extending around the wheel 46 and connected at one end in any well-known way to the adjacent arm 38.

53 indicates a sleeve rotatably mounted on the shaft 51, being held thereon by a nut 54. The sleeve 53 is provided at or near one end with an arm 55 the free end of which is adapted to bear on the web $e'$ at a point slightly rearward of the point from which it unwinds from the adjacent spool 28; at or near its opposite end the sleeve 53 is provided with an arm 56 which is connected through a tension spring 57 with the other end of the brake band 52. By this arrangement it will be seen that when the spool 28 is full, the free end of the arm 55 being in engagement with outer coil of the web $e'$ will, through the sleeve 53 swing the arm 56 outwardly and thus put considerable tension through the spring 57 onto the band 52. As the diameter of the web coil on the spool 28 decreases, due to the unwinding of the web therefrom, the free end of the arm 55 moves inwardly about the shaft 51 and thus proportionately decreases the tension through the spring 57 on the band 52, thereby maintaining a substantially uniform tension on the material or web as it unwinds from the spool. The free end of the arm 55 may be provided with an anti-friction roller 58 for well-known reasons. It will be seen that the tension of the spring 57 also acts through the arm 56, sleeve 53 and arm 55 to hold the latter yieldingly against the web coil so that it cannot pay out from the spool 28 either during operation of the machine or when it is not in use. $55^a$ indicates a counterbalance for the arm 55. The counterbalance serves to overcome the force of gravity upon the arm 55 while it is disposed on the under side of the spool 28 during the revolution of the shuttle $27^a$, and centrifugal forces.

59 is a roller arranged in front of each spool 28 so as to guide the web $e'$ as it unwinds therefrom. The roller is preferably grooved to receive the cords $d$ as the web $e'$ is guided to the former 11. The roller 59 is preferably loosely mounted on a shaft 60 fixed to and extending laterally from the arm 38. The roller 59 may be held on the shaft 60 by a nut 61.

62 indicates as an entirety means for supplying a rubber strip $f$ to one surface of the webs $e'$, $e'$, after they have been wrapped around the former, in the plane of the bead strands *a* and fillers *c*, whereby the strip will extend at an angle to the cords *d*.

The rubber strip *f* is preferably delivered to the upper surfaces of the wound webs *e'* and at a point in front of a consolidating mechanism indicated as an entirety at 63. The strip *f* is preferably as wide as the tire forming material *b*, so that it will advantageously serve as a rubber layer between the convolutions of the material *b*, when it is wound on a core or other device to prevent contact between the cords *d* of the material *b*. The rubber strip *f* is supplied from a roll 64, it being preferably wound thereon together with a liner, such as a strip of muslin *g*, for well-known reasons. 65 indicates a frame member, preferably of substantially U-shape. One leg of the member serves as a support to secure it in an inverted position on the standard 4. The inner or opposing walls of the legs of the U-member are provided with aligned bearings 65ª and pairs of guide walls 65ᵇ to form aligned grooves, which receive shafts 66, 67, respectively. The shaft 66 supports a roll 68 on which the liner is wound after the rubber strip *f* is delivered to the webs *e'*, *e'*. The roll 64 is mounted on the shaft 67 and rests on the roll 68, so that as the rubber strip *f* and liner *g* are drawn from the roll 64, the latter will rotate the roll 68 and cause the liner to wind thereon.

Of the consolidating mechanism 63, 69 indicates a bracket extending from the standard 4 toward the standard 3 and carrying at its outer end two seats 69ª, 69ª, to which are secured in any desired manner a pair of spaced frames 70, 70. Each frame 70 may comprise a pair of bars 71, 71, between which are supported journal boxes or bearings 72, 73, 74. The journal boxes or bearings in one frame 70 co-operate with similar bearings in the other frame 70 to support shafts 75, 76, 77, of three superposed rollers 78, 79, 80, respectively, between which the assembled and correlated materials, *a*, *c*, *d*, *e*, and *f* pass, preferably by two passes (see Fig. 2), to be consolidated into the tire forming material *b*. The shaft 76 for the intermediate roller 79 is connected to and driven by the shaft 8. The shaft 76 is provided with a gear 81, which meshes with gears 82, 83, carried by the inner extended ends of the shafts 75, 77, to drive the same. All of the gears 81, 82 and 83 have the same number of teeth to insure driving of the consolidating rollers 78, 79 and 80 at the same rate of speed. One or more of the rollers 78, 79 and 80 may be provided with steam conduits or made hollow for the circulation of a heating medium, if desired. By preference, the strip *f* and liner *g* are delivered to and around the front side of the roller 78 and carried in between the rollers 78 and 79. The rubber strip *f* is consolidated with the remaining materials, whereas the liner returns to and is wound on the roll 68.

As shown, the materials *a*, *c*, *d*, *e* and *f* pass between the rollers 78 and 79, then around the roller 79, then between the rollers 79 and 80, finally, by preference, passing around the roller 80 from which it leads to a device 84 on which the tire forming material *b* is wound. It will be understood that as the materials *a*, *c*, *d*, *e* and *f* pass through and between the rollers 78, 79 and 80, they are pressed together or consolidated into intimate relation or a substantially integral unitary structure *b*, as shown in Fig. 11, the folded portions of the fillers *c* being consolidated into a single mass surrounding and enclosing the bead strands *a*, as best shown in Figs. 11 and 12.

The rollers 78, 79 and 80 are preferably formed with annular, aligned grooves 79ª to receive the opposite edges of the correlated materials which are enlarged on account of the bead strands *a* and fillers *c* being disposed therein.

To insure sufficient pressure between the rollers 78, 79 and 80, to effect consolidation of the materials *a*, *c*, *d*, *e* and *f*, I mount the journal boxes 72 and 74 for the rollers 78 and 80, respectively, so that the latter can be moved or adjusted toward the roller 79. For this purpose the frames 70 are provided with guides 70ª which slidably support the journal boxes 72, 74. 85 indicates as an entirety means for moving or adjusting the rollers 78 and 80 toward the roller 79. These means preferably include a coiled spring 85ª whereby the pressure is yielding in character. The moving and adjusting means 85 for each journal box for the shafts of the rollers 78 and 80 are similar in construction, hence I will refer to one such means only, as follows: 86 indicates a rod extending through and having screw-threaded engagement with the walls of an opening 87 formed in the end wall of the frame 70 and arranged in the plane of the axes of the rollers 78, 79, 80. The outer end of the rod 86 carries a hand wheel 87ª, whereby it may be readily turned; its inner end is provided with a head or seat member 88 to engage the outer end of the spring 85ª interposed between it and the adjacent journal box (72 or 74). From the foregoing description it will be understood that by operating the wheels 87ª, the rollers 78 and 80 may be yieldingly pressed against the roller 79 to cause any desired degree of pressure upon the materials *a*, *c*, *d*, *e* and *f* to consolidate them into the tire forming material *b*.

These materials may be passed through or between the rollers 78, 79, and then wound on the device 84, but by preference, I pass the materials back through or between the rollers 79, 80, to insure a complete and more uniform consolidation into a unitary web of material.

The device 84 may consist of a drum or reel on which the tire forming material may be wound, but by preference I use a tire carcass core and wind the material *b* thereon, causing it to rotate once for each ply of material which is to constitute the carcass. The core 84 is preferably removably mounted on a chuck 84$^a$, which in turn is fixed to a shaft 84$^b$, mounted in suitable bearings in opposite side walls of the standard 4. 89 indicates a gear fixed to the shaft 84$^b$ and meshing with a pinion 90 on the shaft 7, whereby the shaft 84$^b$ may be driven. When the total number of plies are applied the machine is stopped, the material $b$ severed, and the carcass completed by attaching the free end of the severed material thereto. The carcass and core are then removed and a new core put in position, whereupon the beads of the material $b$ are attached to the core and the machine again started.

When a carcass making apparatus is combined with the machine as shown, the tire forming material is made and immediately utilized for making the carcass.

For a detailed description of the core, and the means for making carcasses thereon, reference may be made to my aforesaid application.

The material $b$ may be applied to the core 84 as it winds thereon by pressure rolling down devices, such as are disclosed in my aforesaid co-pending application.

In operating the machine, the supply reels or spools for the materials $a$, $c$, $d$, $e$ and $f$ are placed in position and the free ends of the materials positioned and correlated on the former 11 with their free ends between the rollers 78, 79, 80, which being driven, will, on application of the power, draw the materials forwardly and unwind them from their spools. Due to the fact that the spools 28 revolve about the former 11 and feed the webs $e'$ at an angle thereto, the cords $d$ and webs $e$ will be helically wound or wrapped around the former 11, spaced bead strands $a$ and fillers $c$, and in such operation the webs $e'$ will engage the fillers $c$ and fold their overlying portions over and around the bead strands $a$. The former 11 terminates at a point in front of the position at which the webs $e'$ engage the bead strands $a$ and fillers $c$, so that the correlated materials may pass directly to and between the consolidating rollers 78, 79, 80. By supporting the supply roll 64 for the strip $f$ so that the latter may be guided downwardly and around the front side of the roller 78 into engagement with the materials $a$, $c$, $d$, and $e$ as they pass in between the rollers 78 and 79, I am enabled to simplify the construction and provide ready access to other parts of the apparatus.

By my construction I am enabled to provide a continuous supply of each of the materials and to conduct substantially all thereof to a position or station where they are arranged in proper correlated position for consolidation. As a result thereof, the machine operates to form into a unitary web of indefinite length all of the materials necessary for the making of a complete tire carcass. When the supply of any of the materials is exhausted a new reel or spool may be positioned in the machine and the ends of the material readily connected, without affecting the strength and uniformity of the material $b$ in its completed form. As the materials are all drawn forwardly at the same rate of speed and the cords $d$ are wrapped continuously around the bead strands $a$, the resulting product is uniformly constructed and devoid of strains and stresses throughout its length; and further, as the cords are in helical formation and compressed into a unitary structure without being cut along the line of fold I am enabled to provide a web of material of indefinite length in which all of the cords are continuous from end to end thereof. Furthermore, as the cords surround the bead strands, the material can be effectively applied to the core without danger of the bead strands becoming detached from the body portion of the material. As the material $b$ constitutes and includes all of the materials necessary for a tire carcass, it can be rapidly and economically made into tire carcasses with all of the plies thereof uniformly applied.

It will further be noted that the former 11 is of substantially rectangular shape in cross section and of a thickness approximately equal to the diameter of the bead strands $a$. As a result of such arrangement, the cords $d$ when wound therearound are in a flattened helical formation with the bead strands adjacent to and within the folded portions of the cords; also, since the cords are wound around the bead strands, while the latter are held in spaced relationship by the former 11, the cords are uniformly applied to and relatively tight around the bead strands and against the opposite flat faces of the former 11, thus positioning the cords $d$, as well as the strip $e$, for consolidation devoid of wrinkles and unevenness to the end that a better and more uniform product results.

I prefer to carry the materials a plurality of times around one or more of the rollers 78, 79 and 80, as such operation prevents slippage of the materials relative to each other and insures feeding thereof at the same rate of speed.

It will also be seen that the cords $d$ and web are continuous and wrapped or folded around the bead strands and then consolidated into a unitary web, which is utilized to form the tire carcass. As a result of this operation and arrangement the side edges of the unitary web are not cut or trimmed prior to or after the web is applied to the core. Thus all waste of material is eliminated; furthermore, this arrangement serves to form a bead lock for each bead strand, as well as to provide bound edges for the web, eliminating all danger of the bead strands being displaced or blown out of the tire carcass.

It will also be noted that the strips of bead material c are of a width to extend around the bead strands and inwardly a considerable distance from the bead strands. By this arrangement it will be seen that the strips serve as fillers to reinforce and strengthen those portions of the web b which form the side walls of the tire carcass, so that when the latter is in use, the fillers tend to prevent flexing of the side walls at points adjacent to the opposite side edges of the wheel rim and to that extent overcome or tend to overcome rim cutting.

Where the web b is made relatively narrow, for instance in making the smaller sizes of tire carcasses, I may omit the bead strands a. In such construction, the strips of bead material c, c, are folded over the edges of the former 11 by the cords d or web e' and then consolidated with the latter by the consolidating mechanism 63, as already described.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In a machine of the character described, the combination of means for supplying spaced beads, means for supplying spaced filler in line with said beads but with a portion extending beyond the edge of each bead, and means for helically wrapping material around said spaced beads, whereby the extended portions of the filler are folded around the beads.

2. In a machine of the character described, the combination of means for supplying spaced beads, means for supplying spaced filler in line with said beads, one above the adjacent bead and the other below the bead adjacent thereto, but with a portion extending beyond the outer edge of each bead, and means for helically wrapping material around said spaced beads, whereby the extended portions of the filler are folded around the beads.

3. In a machine of the character described, the combination of means for supplying spaced bead material, means for delivering at an angle to and wrapping around said spaced bead material a ribbon of parallel arranged cords, and means for adjusting the angle at which said ribbon of cords is delivered.

4. In apparatus of the class described, the combination of means for continuously supplying spaced bead material, means for continuously feeding to and helically winding around said material a ribbon comprising a plurality of cords arranged in parallel relationship, and means for adjusting the direction of feed of said cords.

5. In apparatus of the class described, the combination of means for supplying spaced bead material and spaced fillers in juxtaposition thereto, and means for feeding to and helically winding around said bead material and fillers a ribbon of cords arranged parallel to each other.

6. In apparatus of the class described, the combination of means for continuously supplying and feeding spaced bead material, means for supplying and feeding a filler in juxtaposition to each bead material, and means for continuously feeding to and helically winding around said bead material and fillers as they feed forwardly a ribbon of parallel arranged cords.

7. In apparatus of the class described, the combination of means for supplying and feeding spaced bead material, means for supplying and feeding a filler in juxtaposition to each bead material so that a portion thereof extends beyond the adjacent bead material, and means for feeding to and helically winding around said spaced bead material a ribbon of parallel arranged cords, whereby the extended portions of the fillers are folded around said bead material.

8. In apparatus of the class described, the combination of means for supplying and feeding spaced bead material, means for supplying and feeding a filler in juxtaposition to each bead material so that a portion thereof extends beyond the adjacent bead material, one filler being above one bead material and the other filler being below the other bead material, and means for feeding to and helically winding around said spaced bead material a ribbon of parallel arranged cords, whereby the extended portions of the fillers are folded around said bead material.

9. Mechanism for forming a unitary web for tire carcass making purposes, comprising means for supplying spaced bead material, a shuttle for supplying and helically winding a ribbon of parallel cords around the bead material, means for supplying filler material between the bead material and cords, and means for consolidating the materials into the unitary web.

10. Mechanism for forming a unitary web for tire carcass making purposes, comprising means for supplying spaced bead material, a shuttle for supplying and helically winding a ribbon of parallel cords around the bead material, and means for consolidating the materials into the unitary web, said mechanism including means for supplying a strip of rubber, whereby superposed layers of cords are maintained out of contact.

11. Mechanism for forming a unitary web for tire carcass making purposes, comprising means for supplying spaced bead material, a shuttle for supplying and helically winding a ribbon, comprising a strip of material and a plurality of parallel arranged cords fixed thereto, around the bead material, and means for consolidating the materials into the unitary web.

12. In a machine of the character described, the combination of means for supplying spaced bead material, means for supplying fillers for said bead material, a shuttle for supplying a plurality of cords to and winding them around the bead material and fillers, and means for consolidating said bead material, fillers and cords.

13. In a machine of the character described, the combination of means for supplying spaced bead material, a former for guiding said bead material, a shuttle, means carried by said shuttle for supplying a corded rubber web, means for rotating said shuttle, whereby the web is wound around the spaced bead material in relatively flat helical arrangement, and means for consolidating the opposite walls of the helically wound web and bead material.

14. In a machine of the character described, the combination of means for supplying spaced bead material, means for supplying fillers for said bead material and guiding them in line with and juxtaposition to said bead material, means for supplying a plurality of cords and winding them helically around said bead material and fillers, and means for consolidating portions of the helically wound cords, bead material and fillers.

15. In a machine of the character described, the combination of means for supplying spaced bead material, means for supplying fillers for said bead material and guiding them in line with and juxtaposition to said bead material, means for supplying a plurality of cords in parallel relation at an angle to the line of feed of said bead material and winding them helically around said bead material and fillers, and means for consolidating portions of the helically wound cords, bead material and fillers.

16. In a machine of the character described, the combination of means for supplying spaced bead material, means for supplying fillers for said bead material and guiding them in line with and juxtaposition to said bead material, means for supplying a plurality of cords and winding them helically around said bead material and fillers, means for supplying a strip of rubber to prevent contact between portions or surfaces of the cords, and means for consolidating portions of the helically wound cords, rubber strip, bead material and fillers.

17. In a machine of the character described, the combination of means for supplying spaced bead material, means for supplying fillers, guides for guiding said fillers in juxtaposition to said bead material, one above one bead material and the other below the other bead material, with a portion of each filler extending beyond the adjacent bead material, and means for supplying a plurality of cords to and helically winding them around said bead material and fillers, whereby the latter are folded over the bead material.

18. In a machine of the character described, the combination of means for supplying spaced bead material, means for supplying fillers, guides for guiding said fillers in juxtaposition to said bead material, one above one bead material and the other below the other bead material, with a portion of each filler extending beyond the adjacent bead material, means for supplying a plurality of cords to and helically winding them around said bead material and fillers, whereby the latter are folded over the bead material, and means for consolidating said cords, folded portions of the fillers and bead material.

19. In a machine of the character described, the combination of means for supplying spaced bead material, means for supplying fillers, guides for guiding said fillers in juxtaposition to said bead material, one above one bead material and the other below the other bead material, with a portion of each filler extending beyond the adjacent bead material, and means for supplying a corded rubber web to and helically winding it around said bead material and fillers, whereby the latter are folded over the bead material.

20. In a machine of the character described, the combination of means for supplying spaced bead material, means for supplying fillers, guides for guiding said fillers in juxtaposition to said bead material, one above one bead material and the other below the other bead material, with a portion of each filler extending beyond the adjacent bead material, means for supplying a corded rubber web to and helically winding it around said bead material and fillers, whereby the latter are folded over the bead material, and means for consolidating said cords, folded portions of the fillers and bead material.

21. In a machine of the character described, the combination of means for supplying spaced bead material, means for supplying fillers, guides for guiding said fillers in juxtaposition to said bead material, one above one bead material and the other below the other bead material, with a portion of each bead extending beyond the adjacent bead material, means for supplying a corded rubber web to and helically winding it around said bead material and fillers, whereby the latter are folded over the bead material, and means for supplying a strip of rubber to one surface of said helically wound web.

22. In a machine of the character described, the combination of means for supplying spaced bead material, means for supplying fillers, guides for guiding said fillers in juxtaposition to said bead material, one above one bead material and the other below the other bead material, with a portion of each bead material extending beyond the adjacent bead material, means for supplying a corded rubber web to and helically winding it around said bead material and fillers, whereby the latter are folded over the bead material, means for supplying a strip of rubber to one surface of said helically wound web, and means for consolidating said cords, folded portions of the fillers, rubber strip and bead material.

23. In a machine of the character described, the combination of means for supplying spaced bead material, means for supplying fillers, guides for guiding said fillers in juxtaposition to said bead material, one above one bead material and the other below the other bead material, with a portion of each filler extending beyond the adjacent bead material, and means for supplying a plurality of cords to and helically winding them around said bead material and fillers, whereby the latter are folded over the bead material, said means comprising a shuttle, a spool including means for guiding the cords at an angle to the feed of said means, mounted on the shuttle and means for rotating said shuttle.

24. In apparatus of the class described the combination of means for supplying and feeding spaced bead material, means for supplying and feeding a filler in juxtaposition to each bead material so that a portion thereof extends beyond the adjacent bead material, and means for feeding to and helically winding around said spaced bead material a plurality of cords, whereby the extended portions of the fillers are folded around said bead material.

25. In apparatus of the class described, the combination of means for supplying and feeding spaced bead material, means for supplying and feeding a filler in juxtaposition to each bead material so that a portion thereof extends beyond the adjacent bead material, one filler being above one bead material and the other filler being below the other bead material, and means for feeding to and helically winding around said spaced bead material a plurality of cords, whereby the extended portions of the fillers are folded around said bead material.

26. In apparatus of the class described the combination of a former, means for supplying and feeding spaced bead material along the opposite sides of said former, means for supplying and feeding fillers in juxtaposition to the bead material so that a portion of one filler extends beyond the bead material at one side of the former in a plane below it and a portion of the other filler extends beyond the bead material at the other side of the former in a plane above it, and means for feeding to and helically winding around said spaced bead material a plurality of cords, whereby the extended portions of the fillers are folded around said bead material onto the opposite faces of the former, respectively.

27. In apparatus of the class described, the combination of means for supplying a plurality of materials for tire making purposes, a plurality of pressure rolls between which said materials pass a plurality of times, means for associating said materials in correlated relationship before their engagement with said rolls, and means for driving one of said rolls, whereby said materials are fed through said apparatus and consolidated into a unitary web.

28. In apparatus of the class described, the combination of means for supplying a plurality of materials for tire making purposes, a plurality of pressure rolls correlated to form a plurality of passes between them for the material and guide means for the material as it feeds from one pass to another pass, and means for driving certain of said rolls, whereby said materials are fed through said apparatus and consolidated.

29. In apparatus of the class described, the combination of means for supplying spaced bead material and spaced fillers in juxtaposition thereto, and means for feeding to and helically winding around said bead material and fillers cord material.

30. In a machine of the character described, the combination of a former, means for supplying strips of material along and adjacent to the opposite longitudinal edges of said former, one strip being disposed in a plane above the former and the other strip in a plane below the former and a portion of each of said strips extending beyond the adjacent edge of the former, and means for delivering to and winding around said strips and former tire material, whereby the extended portions of the strips are folded around the edges of the former.

In testimony whereof I affix my signature.

HOWARD I. MORRIS.